United States Patent
Kim et al.

(10) Patent No.: US 8,507,620 B2
(45) Date of Patent: Aug. 13, 2013

(54) PROCESS FOR PREPARING WATER ABSORBENT RESIN WITH HIGH PERFORMANCE

(75) Inventors: Jun-Kyu Kim, Daejeon (KR); Jong-Hyuk Kwon, Incheon (KR); Young-Jae Hur, Daejeon (KR); Yun-Kyung Do, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 249 days.

(21) Appl. No.: 13/154,625

(22) Filed: Jun. 7, 2011

(65) Prior Publication Data

US 2011/0301303 A1    Dec. 8, 2011

(30) Foreign Application Priority Data

Jun. 8, 2010    (KR) .................. 10-2010-0053696

(51) Int. Cl.
  *C08F 2/10*    (2006.01)
  *C08F 20/06*    (2006.01)

(52) U.S. Cl.
  USPC ..... 526/88; 526/306; 526/317.1; 526/318.41; 526/318.43

(58) Field of Classification Search
  None
  See application file for complete search history.

(56) References Cited

U.S. PATENT DOCUMENTS

| 5,250,640 A * | 10/1993 | Irie et al. ................. 526/88 |
| 6,586,549 B1 * | 7/2003 | Hatsuda et al. ............ 526/317.1 |
| 7,009,010 B2 * | 3/2006 | Kanto et al. ............... 526/77 |
| 2010/0062252 A1 * | 3/2010 | Kimura et al. ............. 428/402 |

FOREIGN PATENT DOCUMENTS

| EP | 303440 A2 * | 2/1989 |
| EP | 1113037 A2 * | 7/2001 |
| KR | 1989-0003808 A * | 4/1989 |
| KR | 2001-0062694 A * | 7/2001 |
| WO | WO 03/051939 A1 * | 6/2003 |

* cited by examiner

*Primary Examiner* — Robert Sellers
(74) *Attorney, Agent, or Firm* — McKenna Long & Aldridge, LLP

(57) ABSTRACT

The present invention relates to a process for preparing a water absorbent resin, particularly to a process for preparing a water absorbent resin which can resolve the uneven size of the fine pulverized gel-type resin and long pulverizing time those are the problems of prior process for preparing the water absorbent resin, by carrying out the pulverizing process of the gel-type resin divided into the coarse pulverizing process which is carried out with the internal cross-linking polymerization, and the fine pulverizing process. According to the preparation process, it is possible to mass-produce the water absorbent resin showing excellent absorption under pressure and low extractable content.

10 Claims, 1 Drawing Sheet

S10

Coarse pulverizing a gel-type resin while internal cross-linking the gel-type resin from an aqueous solution of a partially neutralized acrylic acid-based monomer with a first cross-linking agent so as to form a coarse pulverized gel-type resin — S11

Fine pulverizing the coarse pulverized gel-type resin so as to prepare a fine gel-type resin — S12

Drying the fine gel-type resin, and mill and fractionate the dried fine gel-type resin so as to prepare a base resin powder — S13

Surface cross-linking the base resin powder with a second cross-linking agent so as to prepare a water absorbent resin — S14

PROCESS FOR PREPARING WATER ABSORBENT RESIN WITH HIGH PERFORMANCE

TECHNICAL FIELD

The present invention relates to a process for preparing a water absorbent resin showing excellent absorption under pressure and low extractable content, and is suitable for a mass-production, by carrying out a pulverizing process of a gel-type resin divided into a coarse pulverizing process which is carried out with an internal cross-linking polymerization, and a fine pulverizing process.

This application claims priority to Korea Patent Application No. 10-2010-0053696 filed Jun. 8, 2010, and the contents are herein incorporated by reference.

BACKGROUND OF ART

The absorption mechanism of the water absorbent resin is governed by interactions of the osmotic pressure due to the difference of the electric attraction shown by a charge of polymer electrolyte, the affinity between water and the polymer electrolyte, the molecular expansion due to repulsive power between ions of the polymer electrolyte, and the expansion restraint due to cross-link bonds. Namely, the absorbency of the water absorbent resin depends on said affinity and molecular expansion, and the absorption speed is largely influenced by said osmotic pressure of the water absorbent polymer itself. Therefore, the molecular expansion and the osmotic pressure of the water absorbent polymer depend on the density and distribution of the cross-links introduced therein, or the kind of the cross-linking agent.

As the absorbed amount in the water absorbent resin increases, the stream of absorbed fluid is disturbed due to the adhesion phenomenon between the water absorbent resin particles expanded by the fluid. To improve this, there is a method of obtaining the water absorbent resin particles having hard surface by reacting the surface of the water absorbent resin particles with a cross-linking agent. Such core-shell type water absorbent resin is practically increased in not only the absorbency but also the penetration ratio of the fluid under a certain load, and thus it is possible to prepare the water absorbent resin superior in the absorbency and the absorbency under pressure.

As a solution polymerization method for the internal cross-linking polymerization for preparing the water absorbent resin, the polymerization methods using a belt or a kneader as a reactor have been suggested. In the case of belt-type polymerization, an additional gel fractionation process is needed.

International Publication No. WO2003/51939 discloses a production process for a water absorbent resin, comprising the steps of: carrying out polymerization, involving cross-linking, of an aqueous solution of a water-soluble unsaturated monomer including acrylic acid (salt); and at the same time carrying out fine division of the resultant hydrogel, wherein the water-soluble unsaturated monomer contains furfural.

U.S. Pat. No. 5,250,640 discloses a method of pulverizing a hydrogel polymer possessing a cross-linked structure into hydrogel particles by giving shear force thereto in a kneader having rotary stirring shafts.

Korea Patent Publication No. 1989-3808 discloses a method of preparing a water absorbent resin characterized in that a hydrated gel polymer being formed during the course of polymerization is fine pulverized by shear force generated by rotation of stirring shafts within a reaction vessel having a plurality of rotary stirring shafts.

Korea Patent Publication No. 2001-62694 discloses a method of preparing an irregular shape basic water absorbent resin, comprising the steps of: reacting a basic resin and a cross-linking agent in order to obtain the basic water absorbent resin, with the process forwarding a cross-linking reaction and pulverizing the resultant product at the same time.

In prior polymerization methods by a kneader, since the gel fractionation starts with the polymerization and the fractionated gel is discharged from the kneader, the size of the gel fractionated with the polymerization in the kneader is uneven and the residence time must be long in order to make the same to the size suitable to be dried, and thus the methods have a problem of that the absorption properties of the gel-type resin deteriorate.

SUMMARY OF THE INVENTION

It is an aspect of the present invention to provide a process for preparing a water absorbent resin which can resolve the uneven size of the fine pulverized gel-type resin and long pulverizing time those are the problems of prior process for preparing the water absorbent resin, by carrying out the pulverizing process of the gel-type resin divided into the coarse pulverizing process which is carried out with the internal cross-linking polymerization, and the fine pulverizing process, and can mass-produce the water absorbent resin having excellent absorption under pressure and low extractable content.

The present invention provides a process for preparing a water absorbent resin, comprising the steps of: (a) coarse pulverizing a gel-type resin while internal cross-linking and polymerizing the gel-type resin from an aqueous solution of a partially neutralized acrylic acid-based monomer having an acid group, in the presence of a first cross-linking agent, so as to form a coarse pulverized gel-type resin having the size of 3 to 150 mm; (b) fine pulverizing the coarse pulverized gel-type resin so as to prepare a fine gel-type resin having the size of 1 to 20 mm; (c) drying the fine gel-type resin; (d) milling the dried fine gel-type resin and fractionating the same so as to prepare a base resin powder comprising particles having the size of 100 to 850 μm in an amount of 70 weight % or more; and (e) surface cross-linking the base resin powder with a second cross-linking agent so as to prepare the water absorbent resin.

In the process of the present invention, the step (a) may be carried out in a mixing reactor having cutting force or shearing force. At this time, the mixing reactor having cutting force or shearing force comprises a plurality of rotating blades, or a rotating blade and a still blade, and coarse pulverizes the internal cross-linked and polymerized gel-type resin by providing the shearing force thereto, and the rotating speed of the rotating blade may be 3.0 to 300 m/min.

The acrylic acid-based monomer of the present invention may be a compound represented by the following Chemical Formula 1:

$$R^1\text{—COOM}^1 \qquad \text{[Chemical Formula 1]}$$

wherein, $R^1$ is a $C_2$-$C_5$ alkyl group including an unsaturated bond, M' is hydrogen, a monovalent or divalent metal, ammonium group, or an organic amine salt.

The aqueous solution of the partially neutralized acrylic acid-based monomer of the present invention may be an aqueous solution of the acrylic acid-based monomer which is partially neutralized with a neutralization ratio of 40 to 90 mole %.

In the present invention, the first cross-linking agent of the present invention may include at least one selected from group consisting of N,N-methylenebisacrylamide, trimethylolpropane tri(meth)acrylate, ethyleneglycol di(meth)acrylate, polyethyleneglycol(meth)acrylate, propyleneglycol di(meth)acrylate, polypropyleneglycol(meth)acrylate, butandiol di(meth)acrylate, butyleneglycol di(meth)acrylate, diethyleneglycol di(meth)acrylate, hexanediol di(meth)acrylate, triethyleneglycol di(meth)acrylate, tripropyleneglycol di(meth)acrylate, tetraethyleneglycol di(meth)acrylate, dipentaerythritol pentaacrylate, glycerin tri(meth)acrylate, pentaerythritol tetraacrylate, triarylamine, ethyleneglycol diglycidyl ether, propylene glycol, glycerin, and ethylene carbonate.

In the present invention, the coarse pulverized gel-type resin prepared in the step (a) may have moisture content of 30 to 80%.

In the present invention, the fine gel-type resin dried in the step (c) may have moisture content of 0.1 to 15%.

In the present invention, the second cross-linking agent of the present invention may include at least one selected from the group consisting of ethyleneglycol diglycidyl ether, polyethyleneglycol diglycidyl ether, glycerol polyglycidyl ether, propyleneglycol diglycidyl ether, polypropyleneglycol diglycidyl ether, ethyleneglycol, diethyleneglycol, propyleneglycol, triethyleneglycol, tetraethyleneglycol, propanediol, dipropyleneglycol, polypropyleneglycol, glycerin, polyglycerin, butanediol, heptanediol, hexanediol, trimethylolpropane, pentaerythritol, sorbitol, calcium hydroxide, magnesium hydroxide, aluminum hydroxide, iron hydroxide, calcium chloride, magnesium chloride, aluminum chloride, and iron chloride.

The water absorbent resin prepared through the present invention may comprise the particles having the size of 150 to 850 μm in an amount of 90 weight % or more.

The present invention can provide a process for preparing a water absorbent resin which can resolve the uneven size of the fine pulverized gel-type resin and long pulverizing time those are the problems of prior process for preparing the water absorbent resin, by carrying out the pulverizing process of the gel-type resin divided into the coarse pulverizing process which is carried out with the internal cross-linking polymerization, and the fine pulverizing process, and can mass-produce the water absorbent resin having excellent absorption under pressure and low extractable content.

BRIEF DESCRIPTION OF THE DRAWINGS

FIG. 1 is a schematic diagram showing the process for preparing the water absorbent resin according to one embodiment of the present invention.

DETAILED DESCRIPTION OF THE EMBODIMENTS

Hereinafter, the process for preparing the water absorbent resin according to one embodiment of the present invention is explained in more detail.

FIG. 1 is a schematic diagram showing the process for preparing the water absorbent resin according to one embodiment of the present invention. Referring to FIG. 1, the process for preparing a water absorbent resin (S10) according to one embodiment of the present invention may comprise the steps of: (a) coarse pulverizing a gel-type resin while internal cross-linking and polymerizing the gel-type resin from an aqueous solution of a partially neutralized acrylic acid-based monomer having an acid group, in the presence of a first cross-linking agent, so as to form a coarse pulverized gel-type resin having the size of 3 to 150 mm (S11); (b) fine pulverizing the coarse pulverized gel-type resin so as to prepare a fine gel-type resin having the size of 1 to 20 mm (S12); (c) drying the fine gel-type resin; (d) milling the dried fine gel-type resin and fractionating the same so as to prepare a base resin powder comprising particles having the size of 100 to 850 μm in an amount of 70 weight % or more (S13); and (e) surface cross-linking the base resin powder with a second cross-linking agent so as to prepare the water absorbent resin (S14).

According to such preparation process, it is possible to reduce the pulverizing time before the dry, particularly the coarse pulverization process time which is carried out with the internal cross-linking polymerization, and to improve efficiency of the pulverization process before the dry, by carrying out the pulverizing process of the gel-type resin divided into the coarse pulverizing process which is carried out with the internal cross-linking polymerization, and the fine pulverizing process. Like this, as the time spent on the coarse pulverization process which is carried out with the internal cross-linking polymerization is reduced, it becomes possible to suppress that the absorbing performance of the water absorbent resin is deteriorated by preventing an excessive shear force from being provided to the gel-type resin.

Furthermore, the drying time can be shortened more, because the gel-type resin can be equalized and micronized in the size suitable to be dried through said effective coarse pulverizing process and fine pulverizing process.

As a result, it is possible to prepare the water absorbent resin superior in the properties such as the absorption under pressure and the extractable content with high productivity, according to the process of one embodiment of the present invention.

Hereinafter, the process for preparing the water absorbent resin of one embodiment is explained step by step in more detail.

Referring to FIG. 1, as the first step of the preparation process (S10), the coarse pulverized gel-type resin is prepared by coarse pulverizing the gel-type resin to have the size of 3 to 150 mm while internal cross-linking and polymerizing the gel-type resin from the aqueous solution of a partially neutralized acrylic acid-based monomer including acid group in the presence of the first cross-linking agent (S11). In the coarse pulverizing process, the gel-type resin is formed through the internal cross-linking polymerization, and coarse pulverized into a certain size (particle size) simultaneously. Namely, since there is no need to micronize the gel-type to the level suitable for drying process, there is also no need to increase the process time of the internal cross-linking polymerization and coarse pulverization unnecessarily, and it is possible to suppress the deterioration of the performance of the water absorbent resin due to an excessive shear force provided to the gel-type resin. Furthermore, the efficiency of later drying process may also be improved because the gel-type resin can be uniformly micronized to the level suitable for the drying process through the successive fine pulverizing process.

Meanwhile, in the process of the internal cross-linking polymerization and the coarse pulverization, the acrylic acid-based monomer may comprise the acrylic acid-based monomer represented by the following Chemical Formula 1:

$R^1$—COOM$^1$  [Chemical Formula 1]

wherein, $R^1$ is a $C_2$-$C_5$ alkyl group including an unsaturated bond, $M^1$ is hydrogen, a monovalent or divalent metal, ammonium group, or an organic amine salt.

More specifically, the monomer selected from the group consisting of acrylic acid, methacrylic acid, and a monovalent metal salt, a divalent metal salt, an ammonium salt, and an organic amine salt of the same may be used solely or by combination of two or more as the acrylic acid-based monomer.

Furthermore, the acrylic acid-based monomer is used after partially neutralized with an alkali such as sodium hydroxide, potassium hydroxide, ammonium hydroxide, and the like. As the alkali, cheap and nontoxic sodium hydroxide is more preferable.

The degree of neutralization of the acrylic acid-based monomer may be about 40 to 90 mole %, and preferably about 45 to 80 mole %. At this time, the range of the degree of neutralization can be controlled according to the final property of the desired water absorbent resin, however, when the degree of neutralization is too high, the majority of the obtained polymer may undesirably be dissolved in water, inversely, when the degree of neutralization is too low, the absorbency of the water absorbent resin prepared finally may be deteriorated, and it may show the elastic rubber-like property which is difficult to be handled.

The content of the acrylic acid-based monomer in the aqueous solution may be about 20 to 80 weight %, and preferably about 30 to 70 weight %, of the total weight of the aqueous solution of the acrylic acid-based monomer. When the monomer content is satisfied, the internal cross-linking polymerization can be carried out properly in the state of well dissolved monomer, and it is possible to obtain the gel-type resin having the moisture content suitable for the successive coarse pulverization, fine pulverization, and drying process. In addition to, when the monomer content is satisfied, it may be unnecessary to eliminate the unreacted monomer after the polymerization by using a gel effect phenomenon appearing in the polymerization reaction.

The amount of water which is a solvent may be 1 to 5 times of the content of the acrylic acid-based monomer and/or the neutralized alkali salt preferably, and the amount can be determined by considering the polymerization heat control.

The internal cross-linking polymerization process is carried out in the presence of an internal cross-linking agent of the first cross-linking agent. It is positively necessary for maintaining the properties of the prepared water absorbent resin to use the cross-linking agent during preparation of the water absorbent resin. As the method for cross-linking the water absorbent resin, there are a simultaneous cross-linking method which can introduce the cross-linking bond between the water absorbent polymers during the polymerization, and a post cross-linking method which forms the cross-linking bond with the functional group of the water absorbent polymer after the polymerization.

At this time, it is possible to prepare the water absorbent resin possessing superior gel strength and having high absorbency when the cross-linking agent having suitable chain length is used for reducing the decrease of the absorbency due to the increase of the density of cross-linking.

As the polyhydric alcohol-type first cross-linking agent, a material selected from the group consisting of N,N-methylenebisacrylamide, trimethylolpropane tri(meth)acrylate, ethyleneglycol di(meth)acrylate, polyethyleneglycol(meth)acrylate, propyleneglycol di(meth)acrylate, polypropyleneglycol(meth)acrylate, butandiol di(meth)acrylate, butyleneglycol di(meth)acrylate, diethyleneglycol di(meth)acrylate, hexanediol di(meth)acrylate, triethyleneglycol di(meth)acrylate, tripropyleneglycol di(meth)acrylate, tetraethyleneglycol di(meth)acrylate, dipentaerythritol pentaacrylate, glycerin tri(meth)acrylate, pentaerythritol tetraacrylate, triarylamine, ethyleneglycol diglycidyl ether, propylene glycol, glycerin, and ethylene carbonate may be used solely or by combination of two or more, and above this, various materials known as the internal cross-linking agent which can be used to the preparation process of the water absorbent resin may be used as the first cross-linking agent.

The content of the first cross-linking agent may be about 0.001 to 2.0 parts by weight, and preferably about 0.1 to 1.8 parts by weight per 100 parts by weight of the acrylic acid-based monomer.

The internal cross-linking polymerization reaction using the first cross-linking agent may be carried out at the temperature of about 20 to 750, preferably at about 30 to 700, and the internal cross-linking polymerization reaction time may be for about 1 minute to 1 hour, and preferably for about 2 to 30 minutes. However, it goes without saying that the reaction time can be adequately changed by considering the amount of the reactant.

The internal cross-linking polymerization reaction can be carried out in the presence of a polymerization initiator, and a radical polymerization initiator such as potassium persulfate, sodium persulfate, ammonium persulfate, hydrogen peroxide, t-butylhydro peroxide, hydrochloride of 2,2-azobis-2-amidinopropane, and the like, or a photo-polymerization initiator such as 2-hydroxy-2-methyl-1-phenyl-propane-1-on may be used as the polymerization initiator. A reducing agent promoting degradation of the polymerization initiator may be used jointly, and it is possible to use a redox-based initiator according to combination of both compounds. As the reducing agent, a sulfite such as sodium sulfite or sodium bisulfate, a reducing metal such as ferrous salt and the like, L-ascorbic acid, or amines may be used solely or by combination thereof, but it is not limited to or by these.

The concentration of the initiator may be about 0.001 to 1.0 parts by mole, and preferably about 0.1 to 0.7 parts by mole per 100 parts by mole of the acrylic acid-based monomer. The initiator may be used with a redox catalyst, and it is preferable to use L-ascorbic acid.

Meanwhile, in the preparation method according to one embodiment, the coarse pulverizing process which pulverizes the gel-type resin to have the size of about 3 to 150 mm, and preferably about 5 to 100 mm, may be carried out simultaneously with carrying out said internal cross-linking polymerization reaction. At this time, the size of the gel-type resin can be defined as the longest distance of straight line connecting arbitrary two points on the particle. Through this whole specification, the size of the gel-type resin, the base resin powder, or the water absorbent resin may be identically defined.

As disclosed above, the preparation process can prevent that the time of coarse pulverizing process which is carried out simultaneously with the internal cross-linking polymerization becomes excessively longer, by further pulverizing and equalizing the gel-type resin to the size suitable for the drying process after coarse pulverizing the gel-type resin simultaneously with the internal cross-linking polymerization reaction. Namely, it is possible to prevent that the gel-type resin is unnecessarily deteriorated during the internal cross-linking polymerization and coarse pulverizing process, and that the property such as the absorption under pressure of the water absorbent resin deteriorates, by carrying out the coarse pulverizing process just for the time necessary to the polymerization so as to prepare the gel-type resin firstly and then carrying out another fine pulverizing process. Furthermore, the particle size of the gel-type resin may be pulverized and equalized to the size suitable to be dried through the coarse pulverizing process and the successive fine pulverizing process.

In order to carry out the coarse pulverization, the step (a) may be carried out in a mixing reactor having cutting force or shearing force. The coarse pulverizing process may be carried out by giving cutting force or shearing force to the gel-type resin while carrying out the internal cross-linking polymerization reaction by using the mixing reactor. Representative examples of the mixing reactor may be a Single-Screw Kneader, a Twin-Screw Kneader, a Single-Screw Extruder, or a Twin-Screw Extruder, and it is possible to carry out the internal cross-linking polymerization reaction and the coarse pulverizing process at the same time by heating the inside of the mixing reactor.

However, the internal cross-linking polymerization reaction and the coarse pulverizing process may also be carried out in an arbitrary pulverizer or mixing reactor which can pulverize the gel-type resin by providing the forces of cutting, shearing, shock, abrasion, and the like, in addition to said mixing reactors. However, the internal cross-linking polymerization reaction and the coarse pulverizing process may preferably be carried out in a mixing reactor or a pulverizer having cutting force or shearing force in order to coarse pulverize the gel-type resin having certain moisture content adequately and uniformly.

The mixing reactor having cutting force or shearing force may comprise a plurality of rotating blades, or a rotating blade and a still blade, and can coarse pulverize the internal cross-linked and polymerized gel-type resin by providing the shearing force thereto, and the rotating speed of the rotating blade may be about 3.0 to 300 m/min, and preferably about 50 to 200 m/min, at this time. The coarse pulverizing process may be carried our for the time required to polymerize the resin, for example, for about 1 minute to 1 hour, preferably for about 2 to 30 minutes, and more preferably for about 15 minutes, in the mixing reactor and the like, and thus it is possible to carry out the coarse pulverizing process adequately with alleviating concerns of the deterioration of the gel-type resin or the decrease of the properties of the water absorbent resin.

Such coarse pulverized gel-type resin may have the moisture content of about 30 to 80%, preferably about 30 to 70%, and more preferably about 40 to 60%, the successive fine pulverizing process and drying process can be effectively carried out by using the gel-type resin having such moisture content.

Meanwhile, as the second step of one embodiment of the preparation method, a fine gel-type resin is formed by fine pulverizing the coarse pulverized gel-type resin (S12). Through the fine pulverizing process, the fine gel-type resin having the even size of about 1 to 20 mm, and preferably of about 2 to 10 mm can be obtained. Since the fine gel-type resin has fine and even size (particle size) and large surface area, the successive drying process can be effectively carried out. Consequently, the time of drying process can be shortened and become efficient, and the deterioration of the fine gel-type resin due to excessive dry and the deterioration of the properties such as absorbency of the water absorbent resin prepared finally can be prevented.

Such fine pulverizing process can be carried out by using an arbitrary pulverizing device such as a mincer, a meat chopper, a high speed rotation crusher, shear granulation machines, and the like, which can fine pulverize the coarse pulverized gel-type resin having the size of about 3 to 150 mm into the even size of about 1 to 20 mm.

The fine pulverizing process can be carried out for the adequate time by considering the size of the coarse pulverized gel-type resin. Since the fine pulverizing process pulverizes the already coarse pulverized gel-type resin more finely and evenly, even if the process is carried out for a short time, it is possible to obtain the fine gel-type resin having the suitable size for drying process.

Meanwhile, the fine gel-type resin is dried after the fine pulverizing process, as the third step. The drying process can be carried out by heating process, for example, can be carried out at the temperature of 100□ to 250□, and preferably at about 150□ to 180□, for about 20 to 90 minutes, and preferably for about 30 to 50 minutes. Since the drying process is carried out by using the already fine pulverized gel-type resin, it is possible to reduce the drying time, and the dried fine gel-type resin having low moisture content as the final water absorbent resin can be obtained even by this process. For example, said dried gel-type resin may have the moisture content of about 0.1 to 15%, and preferably about 1 to 10%. In addition to, the concern about the decrease of the properties such as the absorbency of the water absorbent resin due to the deterioration of the fine gel-type resin can be reduced because it is unnecessary to carry out the excessive drying process.

The drying process can be carried out by heating, and it may be carried out by using a common drier or heating furnace. As a typical example of the device usable for the heat treatment, a grooved-type mixing drier, a centrifugal drier, a disc drier, a fluid-bed drier, a flash drier, an infrared dryer, and the like may be used.

After the drying process, the base resin powder is prepared by milling and fractionating the dried water absorbent resin, as the fourth step.

The milling process may use a roll mill in order to mill the dried fine gel-type resin, in addition to, a pin mill, a hammer mill, a screw mill, a disc mill, a jog mill, and the like may be used, or any milling device or pulverizer which is applicable to the fine pulverization of the gel-type resin may also be applied equally.

The polymer obtained after the final milling step may comprise the particles having the size of 100 to 850 μm in an amount of 60 weight % or more, and preferably 70 weight % or more. However, the particles having the diameter below about 100 μm or over 850 μm may be included therein even after the final milling process. Therefore, the finally milled polymer is fractionated so as to prepare the base resin powder. Such fractionation may be carried out according to the method of eliminating the particles having the diameter below about 100 μm or over 850 μm by using a common sieve, and consequently the base resin powder comprising the particles having the size of 100 to 850 μm in an amount of 70 weight % or more, and preferably 80 weight % or more can be obtained selectively.

Meanwhile, after the fractionation, the base resin powder is surface-cross-linked with a second cross-linking agent so as to prepare the water absorbent resin (S14), as the final step.

As the second cross-linking agent, an epoxy compound such as ethyleneglycol diglycidyl ether, polyethyleneglycol diglycidyl ether, glycerol polyglycidyl ether, propyleneglycol diglycidyl ether, polypropyleneglycol diglycidyl ether, and the like; a polyhydric alcohol compound such as ethyleneglycol, diethyleneglycol, propyleneglycol, triethyleneglycol, tetraethyleneglycol, propanediol, dipropyleneglycol, polypropyleneglycol, glycerin, polyglycerin, butanediol, heptanediol, hexanediol, trimethylolpropane, pentaerythritol, sorbitol, and the like; and a polyvalent metal compound such as a hydroxide or chloride of calcium, magnesium, aluminum, iron, and the like may be used solely or by combination of two or more, however, it is not limited to or by this.

The content of the second cross-linking agent may be about 0.001 to 2.0 parts by weight, and preferably about 0.1 to 1.8 parts by weight per 100 parts by weight of the base resin powder. The reaction temperature of the second cross-linking reaction is preferably about 150 to 250□. The second cross-linking reaction may be terminated within the time of about 1 minute to 4 hours.

However, the relative amount of the first cross-linking agent and the second cross-linking agent used may be controlled according to the chain length and the kind of the cross-linking agents.

According to said preparation process, the water absorbent resin superior in the properties such as the absorbency can be prepared with high productivity, and it is due to the optimized pulverizing process before the drying process, and the successive drying process.

EXAMPLES

The present invention is explained in the following examples in more detail. However, the following examples are only for explaining the present invention and the present invention is not limited to or by the following examples.

Example 1

Preparation of Water Absorbent Resin

A monomer composition of which the monomer content was 50 weight % was prepared by mixing acrylic acid of 500 g, polypropyleneglycol diacrylate of 1.5 g, sodium hydroxide (NaOH) of 194.5 g, and water of 519.5 g. And then, the monomer composition was introduced into a continuously mixing kneader reactor through its feeding part, and 1% hydroperoxide aqueous solution of 5 g and 2% ascorbic acid solution of 5 g were introduced to and mixed with the monomer solution. The polymerization was started 1 minute after a polymerization initiator was mixed, and was continuously carried out for 30 minutes. At this time, the internal temperature of the reactor was 70□. At this time, the coarse pulverization was carried out together by using a plurality of rotating blades included in the kneader reactor. In the prepared gel-type resin, all of the particles had the size of about 10 to 120 mm, and the gel-type resin having the size of 20 mm or more was about 30%. And, the moisture content of the gel-type resin was about 40%.

After this, the coarse pulverized gel-type resin was transferred to a mincer and fine pulverized, and the fine gel-type resin having the size (particle size) of about 1 to 10 mm was prepared as a result.

Continuously, the fine gel-type resin was dried in a hot-air drier of 180□ for 1 hour so as to obtain the dried gel-type resin of which the moisture content was about 5%, and the dried gel-type resin was milled by a pin mil crasher and fractionated by using a sieve so as to obtain the base resin powder comprising only the particles having the size of 100 μm to 850 μm A solution comprising 1,3-propanediol of 1.0 part by weight and water of 1.0 part by weight per the base resin powder of 100 parts by weight was sprayed to and mixed with the base resin powder. The base resin powder to which the surface cross-linking agent (1,3-propanediol) and water were sprayed was introduced into a surface cross-linking reactor which was heated by a heated oil and electricity, and the surface cross-linking reaction was carried out at 180□ for 20 minutes. After the surface cross-linking reaction, the water absorbent resin powder having the size of 100 μm to 850 μm was obtained via an additional cooling step.

Example 2

Preparation of Water Absorbent Resin

The coarse pulverized gel-type resin was prepared substantially according to the same method as in Example 1, except that the polymerization and coarse pulverization time in the kneader reactor was 15 minutes. In the coarse pulverized gel-type resin, all of the particles had the size of about 15 to 130 mm, and the gel-type resin having the size of 20 mm or more was about 50%. And, it was recognized that the moisture content of the gel-type resin was about 45%.

After this, the fine gel-type resin having the size (particle size) of about 1 to 10 mm was prepared by carrying out the fine pulverization substantially according to the same method as in Example 1.

Continuously, the water absorbent resin powder having the size of 100 μm to 850 μm was obtained by carrying out the processes of drying, milling, fractionating, and surface cross-linking substantially according to the same method as in Example 1.

Example 3

Preparation of Water Absorbent Resin

The coarse pulverized gel-type resin was prepared substantially according to the same method as in Example 1, except that the polymerization and coarse pulverization time in the kneader reactor was 5 minutes. In the coarse pulverized gel-type resin, all of the particles had the size of about 20 to 150 mm, and the gel-type resin having the size of 20 mm or more was about 65%. And, it was recognized that the moisture content of the gel-type resin was about 45%.

After this, the fine gel-type resin having the size (particle size) of about 1 to 10 mm was prepared by carrying out the fine pulverization substantially according to the same method as in Example 1.

Continuously, the water absorbent resin powder having the size of 100 μm to 850 μm was obtained by carrying out the processes of drying, milling, fractionating, and surface cross-linking substantially according to the same method as in Example 1.

Comparative Example 1

Preparation of Water Absorbent Resin

The polymerization and coarse pulverization was carried out substantially according to the same method as in Example 1, except that the polymerization and coarse pulverization time was sufficiently long, about 1.5 hours. In the coarse pulverized gel-type resin, all of the particles had the size of about 5 to 20 mm, and the gel-type resin having the size of 20 mm or more did not exist.

The water absorbent resin powder having the size of 100 μm to 850 μm was obtained by carrying out the processes of drying, milling, fractionating, and surface cross-linking substantially according to the same method as in Example 1, without the fine pulverizing process.

Comparative Example 2

Preparation of Water Absorbent Resin

The coarse pulverized gel-type resin was prepared substantially according to the same method as in Example 1. After this, the drying process was carried out substantially according to the same method as in Example 1, except that the fine pulverizing process was not carried out.

However, it was recognized that the gel-type resin must be dried in the hot-air drier of 180□ for 5 hours in order to obtain the dried gel-type resin having the moisture content of 5%.

After this, the water absorbent resin powder having the size of 100 μm to 850 μm was obtained by carrying out the processes of drying, milling, fractionating, and surface cross-linking substantially according to the same method as in Example 1.

EXPERIMENTAL EXAMPLES

Evaluation on the Properties of the Water Absorbent Resin

Experimental Example 1

Fluid Retention Capacity

To the water absorbent resins prepare by above methods, the fluid retention capacity was measured as follows. The measurement of the fluid retention capacity was according to EDANA method WSP 241.2. The fluid retention capacity was measured according to the method of inserting the specimen of 0.2 g in a tea bag and sealing the same, dipping the same in 0.9% salt solution for 30 minutes to absorb the solution, and measuring the salt solution absorbed in the water absorbent resin by measuring the weight after eliminating water from the specimen for 3 minutes in a centrifugal separator which was set to 250 G.

Experimental Example 2

Absorption Under Pressure

To the water absorbent resins prepare by above methods, the absorption under pressure was measured as follows. The measurement of the absorption under pressure was according to EDANA method WSP 242.2. The specimen of 0.9 g was evenly spread in a cylinder for measurement, and pressured by a piston and a balance weight to be 49.2 g/cm² (0.7 psi), and then it was transferred to a schale comprising 0.9% salt solution, and the solution was absorbed in the specimen for 60 minutes. After 60 minutes, the increased weight was divided by the amount of the specimen so as to obtain the absorption under pressure.

Experimental Example 3

Extractable Content

To the water absorbent resins prepare by above methods, the extractable content was measured as follows. The measurement of the extractable content was according to EDANA method WSP 270.2. The specimen of 1.0 g was introduced in 200 ml of 0.9% salt solution and stirred at 500 rpm for 16 hours, and then the aqueous solution was filtered with a filter paper. 50 ml of the filtered solution was titrated primarily with 0.1N caustic soda solution to pH 10.0, and back titrated with 0.1N hydrogen chloride solution to pH 2.7, and then the polymer materials which were not cross-linked were calculated as the extractable content.

The properties of the water absorbent resins of Examples 1 to 3, and Comparative Examples 1 and 2 measured by above methods are listed in the following Table 1.

TABLE 1

| | Fluid Retention Capacity (g/g) | Absorption Under Pressure (g/g) | Extractable content (wt %) |
|---|---|---|---|
| Example 1 | 36 | 24 | 12 |
| Example 2 | 36 | 26 | 10 |
| Example 3 | 37 | 27 | 7 |
| Comparative Example 1 | 36 | 17 | 20 |
| Comparative Example 2 | 46 | 9 | 35 |

From the results of above experiments, it is recognized that the water absorbent resins prepared in Examples 1 to 3 show very satisfactory performances of high absorption under pressure and low extractable content in comparison with Comparative Examples 1 and 2.

In comparison, it is recognized that the water absorbent resin of Comparative Example 1 shows inferior absorption under pressure and extractable content because the gel-type resin is deteriorated during the long polymerization and coarse pulverization process, and the water absorbent resin of Comparative Example 2 needs long drying time for the gel-type resin, and the fluid retention capacity becomes high because the resin is deteriorated during the long drying process, but it also shows inferior performances of largely decreased absorption under pressure and largely increased extractable content.

The invention claimed is:

1. A process for preparing a water absorbent resin, comprising the steps of:
   (a) coarse pulverizing a gel-type resin while internal cross-linking and polymerizing the gel-type resin from an aqueous solution of a partially neutralized acrylic acid-based monomer having an acid group, in the presence of a first cross-linking agent, so as to form a coarse pulverized gel-type resin having the size of 3 to 150 mm;
   (b) fine pulverizing the coarse pulverized gel-type resin so as to prepare a fine gel-type resin having the size of 1 to 20 mm;
   (c) drying the fine gel-type resin;
   (d) milling the dried fine gel-type resin and fractionating the same so as to prepare a base resin powder comprising particles having the size of 100 to 850 μm in an amount of 70 weight % or more; and
   (e) surface cross-linking the base resin powder with a second cross-linking agent so as to prepare the water absorbent resin.

2. The process for preparing the water absorbent resin according to claim 1, wherein the step (a) is carried out in a mixing reactor having cutting force or shearing force.

3. The process for preparing the water absorbent resin according to claim 2, wherein the mixing reactor having cutting force or shearing force comprises a plurality of rotating blades, or a rotating blade and a still blade, and coarse pulverizes the internal cross-linked and polymerized gel-type resin by providing the shearing force thereto, and the rotating speed of the rotating blade is 3.0 to 300 m/min.

4. The process for preparing the water absorbent resin according to claim 1, wherein the acrylic acid-based monomer is a compound represented by the following Chemical Formula 1:

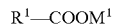
 [Chemical Formula 1]

wherein, $R^1$ is a $C_2$-$C_5$ alkyl group including an unsaturated bond, $M^1$ is hydrogen, a monovalent or divalent metal, ammonium group, or an organic amine salt.

5. The process for preparing the water absorbent resin according to claim 1, wherein the aqueous solution of the partially neutralized acrylic acid-based monomer is an aqueous solution of the acrylic acid-based monomer of which 40 to 90 mole % is neutralized.

6. The process for preparing the water absorbent resin according to claim 1, wherein the first cross-linking agent includes at least one selected from group consisting of N,N-methylenebisacrylamide, trimethylolpropane tri(meth)acrylate, ethyleneglycol di(meth)acrylate, polyethyleneglycol (meth)acrylate, propyleneglycol di(meth)acrylate, polypropyleneglycol(meth)acrylate, butandiol di(meth)acrylate, butyleneglycol di(meth)acrylate, diethyleneglycol di(meth)acrylate, hexanediol di(meth)acrylate, triethyleneglycol di(meth)acrylate, tripropyleneglycol di(meth)acrylate, tetraethyleneglycol di(meth)acrylate, dipentaerythritol pentaacrylate, glycerin tri(meth)acrylate, pentaerythritol tetraacrylate, triarylamine, ethyleneglycol diglycidyl ether, propylene glycol, glycerin, and ethylene carbonate.

7. The process for preparing the water absorbent resin according to claim 1, wherein the coarse pulverized gel-type resin prepared in the step (a) has the moisture content of 30 to 80%.

8. The process for preparing the water absorbent resin according to claim 1, wherein the fine gel-type resin dried in the step (c) has the moisture content of 0.1 to 15%.

9. The process for preparing the water absorbent resin according to claim 1, wherein the second cross-linking agent includes at least one selected from the group consisting of ethyleneglycol diglycidyl ether, polyethyleneglycol diglycidyl ether, glycerol polyglycidyl ether, propyleneglycol diglycidyl ether, polypropyleneglycol diglycidyl ether, ethyleneglycol, diethyleneglycol, propyleneglycol, triethyleneglycol, tetraethyleneglycol, propanediol, dipropyleneglycol, polypropyleneglycol, glycerin, polyglycerin, butanediol, heptanediol, hexanediol, trimethylolpropane, pentaerythritol, sorbitol, calcium hydroxide, magnesium hydroxide, aluminum hydroxide, iron hydroxide, calcium chloride, magnesium chloride, aluminum chloride, and iron chloride.

10. The process for preparing the water absorbent resin according to claim 1, wherein the coarse pulverizing time in the step (a) is about 1 minute to 1 hour.

* * * * *

UNITED STATES PATENT AND TRADEMARK OFFICE
CERTIFICATE OF CORRECTION

PATENT NO. : 8,507,620 B2  Page 1 of 1
APPLICATION NO. : 13/154625
DATED : August 13, 2013
INVENTOR(S) : Jun-Kyu Kim et al.

It is certified that error appears in the above-identified patent and that said Letters Patent is hereby corrected as shown below:

Title page

Item (73) Assignee: Should read

LG Chem, Ltd., Seoul, Republic of Korea

Signed and Sealed this
Twentieth Day of October, 2015

Michelle K. Lee
*Director of the United States Patent and Trademark Office*